US010054936B2

(12) United States Patent
Gobalakrishnan et al.

(10) Patent No.: US 10,054,936 B2
(45) Date of Patent: Aug. 21, 2018

(54) MANUFACTURING EXECUTION SYSTEM AND METHOD OF DETERMINING PRODUCTION METRICS FOR A LINE

(71) Applicant: Invensys Systems, Inc., Foxboro, MA (US)

(72) Inventors: Raghavendran Gobalakrishnan, Chester Springs, PA (US); Keith Richard Frantz, Richland, PA (US); Jeffrey Kohen Barkehanai, Lake Forest, CA (US)

(73) Assignee: Schneider Electric Software, LLC, Lake Forest, CA (US)

(*) Notice: Subject to any disclaimer, the term of this patent is extended or adjusted under 35 U.S.C. 154(b) by 406 days.

(21) Appl. No.: 14/741,700

(22) Filed: Jun. 17, 2015

(65) Prior Publication Data

US 2015/0286212 A1 Oct. 8, 2015

Related U.S. Application Data

(63) Continuation-in-part of application No. 14/194,151, filed on Feb. 28, 2014, now Pat. No. 9,678,505.

(51) Int. Cl.
*G05B 19/418* (2006.01)
*G06Q 10/06* (2012.01)
*G06Q 50/04* (2012.01)

(52) U.S. Cl.
CPC ....... *G05B 19/41865* (2013.01); *G06Q 10/06* (2013.01); *G06Q 50/04* (2013.01); *G05B 2219/31372* (2013.01); *G05B 2219/31432* (2013.01); *G05B 2219/32404* (2013.01); *G05B 2219/39159* (2013.01); *Y02P 90/12* (2015.11); *Y02P 90/20* (2015.11); *Y02P 90/26* (2015.11); *Y02P 90/30* (2015.11)

(58) Field of Classification Search
CPC ............ G05B 19/418; G05B 19/41815; G05B 19/41865; G05B 19/41885; G06Q 50/04; G06Q 10/06
USPC ......................................................... 700/97
See application file for complete search history.

(56) References Cited

U.S. PATENT DOCUMENTS 3,703,725 A * 11/1972 Gomersall ......... G05B 19/4189
198/358
5,946,661 A * 8/1999 Rothschild ....... G05B 19/41865
377/16

(Continued)

*Primary Examiner* — Jason D Mitchell
(74) *Attorney, Agent, or Firm* — Senniger Powers LLP

(57) ABSTRACT

A manufacturing execution system (MES) for providing an indication of the performance of the line. The MES includes a configuration module for modeling entities and lines containing the entities. The MES also includes a runtime module configured to determine the entities on the line whose production can be extrapolated to evaluate the performance of the line. In some cases, the MES determines which of the entities on the line limits the performance of the line; in other cases, the MES determines which of the entities has a production amount that best represents that of the line. The MES is operatively connected to field inputs associated with the entities that provide production data for the entities. Using the production data for the entities chosen to represent the line, the MES generates production metrics representative of the performance of the line and displays them to MES users.

20 Claims, 13 Drawing Sheets

(56) References Cited

U.S. PATENT DOCUMENTS

| | | | | |
|---|---|---|---|---|
| 5,966,694 | A * | 10/1999 | Rothschild | G06Q 10/0639 705/7.37 |
| 7,072,731 | B1 * | 7/2006 | Barto | G05B 19/41865 700/102 |
| 7,558,638 | B2 * | 7/2009 | Chang | G05B 19/4184 700/100 |
| 8,706,702 | B2 * | 4/2014 | Marquez | G06F 9/544 707/690 |
| 9,678,505 | B2 * | 6/2017 | Troy | G05B 19/41865 |
| 2001/0042359 | A1 * | 11/2001 | Franzaroli | B65B 25/146 53/435 |
| 2002/0099463 | A1 * | 7/2002 | Sakaguchi | G05B 19/41875 700/111 |
| 2003/0009253 | A1 * | 1/2003 | McIntyre | G05B 23/0216 700/108 |
| 2003/0130756 | A1 * | 7/2003 | Baweja | G05B 19/41865 700/100 |
| 2003/0158618 | A1 * | 8/2003 | Browning | G05B 19/41865 700/99 |
| 2003/0167238 | A1 * | 9/2003 | Zeif | G05B 23/0267 705/400 |
| 2004/0034555 | A1 * | 2/2004 | Dismukes | G06Q 10/06 700/120 |
| 2006/0142886 | A1 * | 6/2006 | Ishibashi | G05B 19/41865 700/99 |
| 2006/0206222 | A1 * | 9/2006 | Dyer | G06Q 10/06 700/95 |
| 2011/0022212 | A1 * | 1/2011 | Nonaka | G05B 19/4184 700/108 |
| 2014/0180750 | A1 * | 6/2014 | Liebich | G06F 17/246 705/7.25 |
| 2015/0105887 | A1 * | 4/2015 | Troy | G05B 19/41865 700/97 |

* cited by examiner

| | | Primary Key Identifier | Foreign Key Identifier (Definition Record) | Foreign Key Identifier (Line Model) | Foreign Key Identifier (Entity) | Line Position | Can be the bottleneck? |
|---|---|---|---|---|---|---|---|
| 222 | Name | | 233 | 234 | 236 | 238 | 242 |
| | | | 233 | 234 | 236 | 238 | 242 |
| 224 | Identifier | | 233 | 234 | 236 | 238 | 242 |
| | | | 233 | 234 | 236 | 238 | 242 |
| 212 | Unit of Measure | | 233 | 234 | 236 | 238 | 242 |
| | | | 233 | 234 | 236 | 238 | 242 |
| 214 | Standard Item | | 233 | 234 | 236 | 238 | 242 |
| | | | 233 | 234 | 236 | 238 | 242 |
| 216 | Batch Size | | 233 | 234 | 236 | 238 | 242 |
| | | | 233 | 234 | 236 | 238 | 242 |
| 226 | Bottleneck Line Position | | 233 | 234 | 236 | 238 | 242 |
| | | | 233 | 234 | 236 | 238 | 242 |
| | Production Source Entity Line Position | | 233 | 234 | 236 | 238 | 242 |
| | | | 233 | 234 | 236 | 238 | 242 |

Add Line
Configuration

Save

Line Info

Name *

Labor Load(people)

Maximum Work Orders

1

Standard Item

Not Defined  Change

Batch Size

1

Production Unit Of Measure hours/batch

Parent Entity for Scheduling

Spare 1

Spare 2

Spare 3

Spare 4

200A

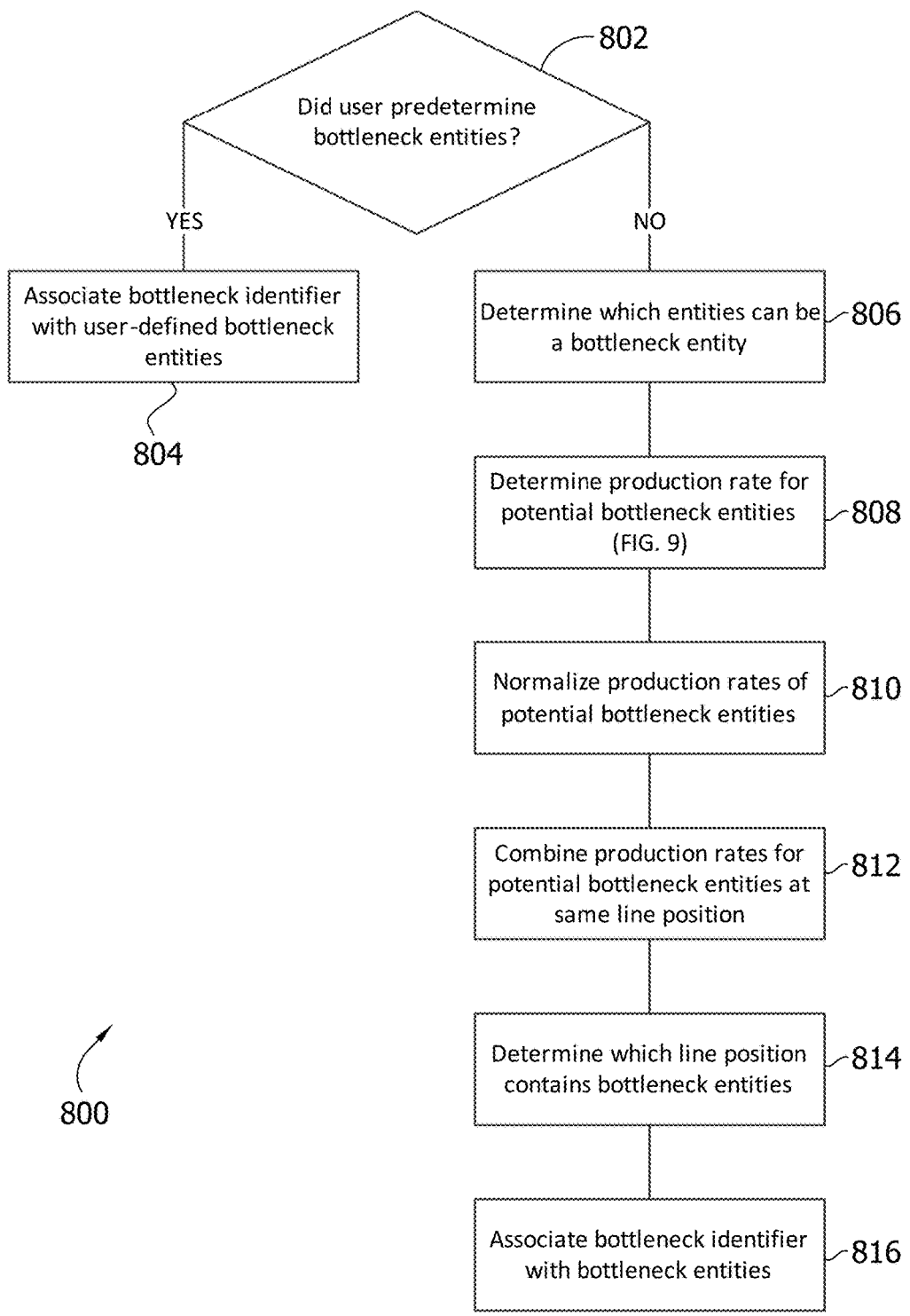

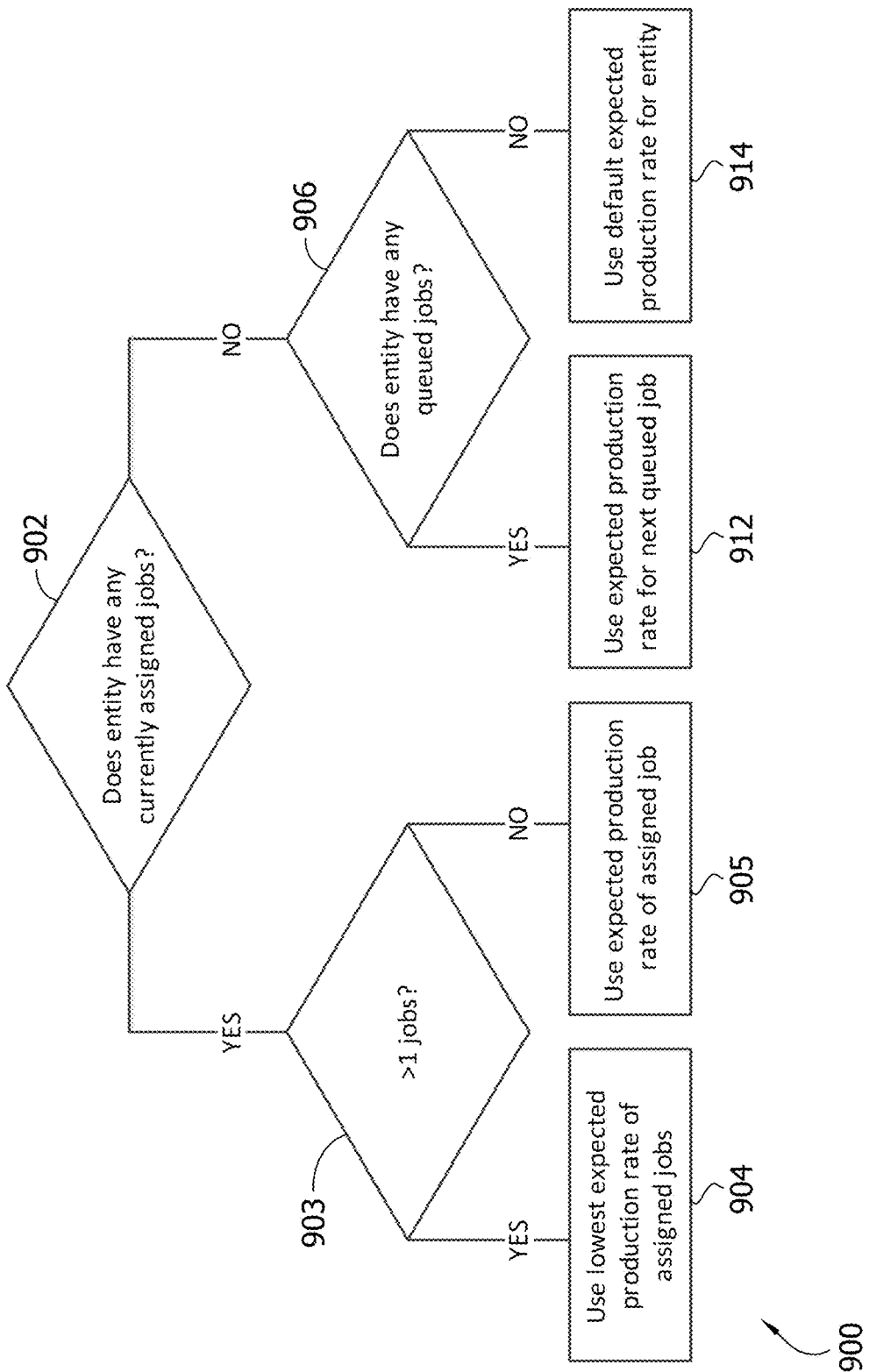

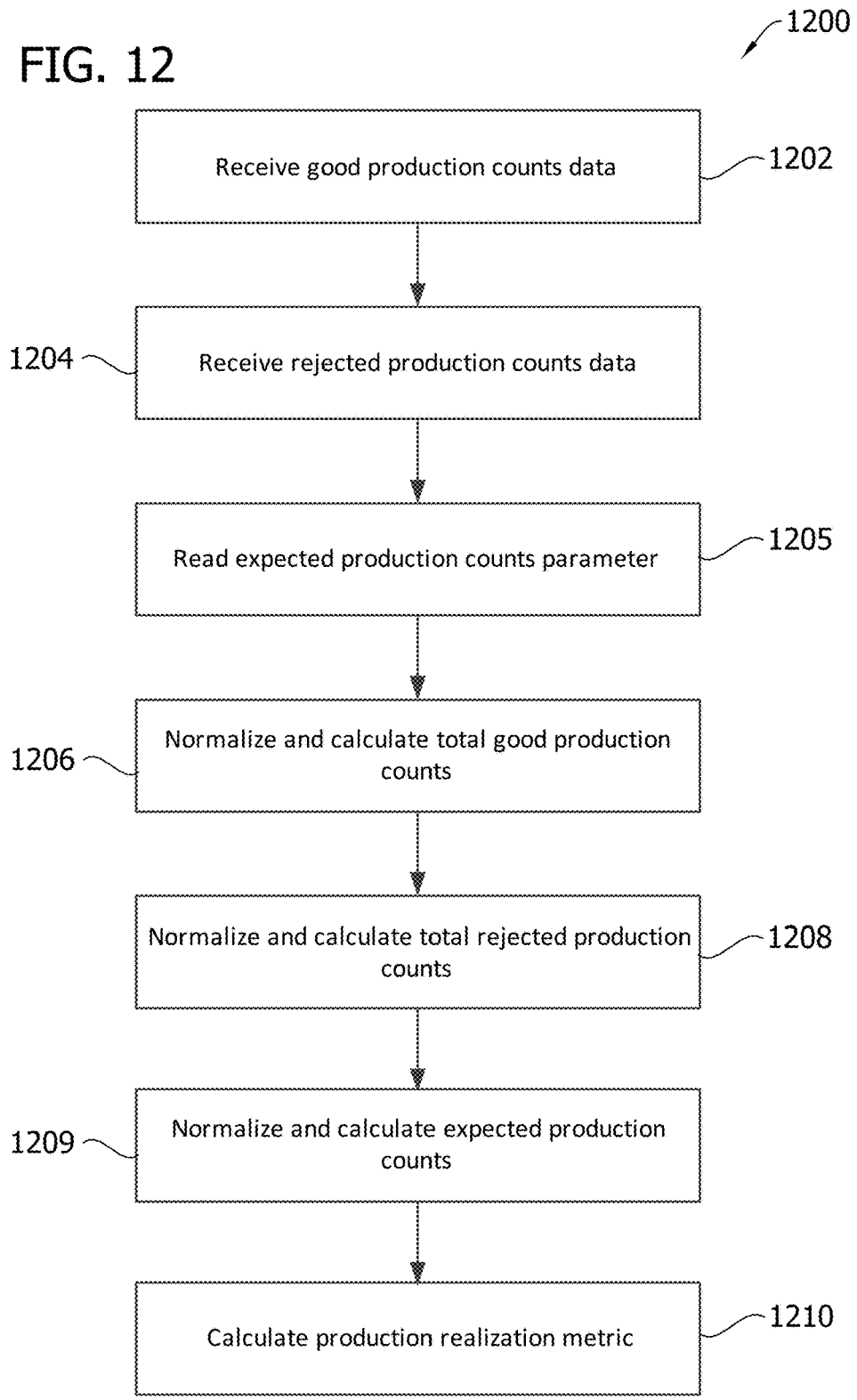

MANUFACTURING EXECUTION SYSTEM AND METHOD OF DETERMINING PRODUCTION METRICS FOR A LINE

CROSS-REFERENCE TO RELATED APPLICATION

This application is a continuation-in-part of U.S. patent application Ser. No. 14/194,151, filed Feb. 28, 2014, entitled LINE MANAGEMENT IN MANUFACTURING EXECUTION SYSTEM. The entire contents of the above application are hereby incorporated by reference.

BACKGROUND

A manufacturing execution system (MES) monitors production and records various production/manufacturing events in an industrial process for use in managing the process. Based on the monitored and recorded information, an MES produces a series of views that report the performance of the industrial process to one or more users. Conventional industrial processes are arranged logically. Physical assets are arranged in an ordered sequence to perform process steps. A typical MES is configured to model the physical assets and groups of physical assets of an industrial process as discrete entities, without representing the logical relationships between the entities. An improved MES, which uses the relationships between the physical assets of an industrial process to enhance quality of its production metrics, is desired.

SUMMARY

Briefly, aspects of the present invention generally relate to networked computerized systems used to monitor, log, and display relevant manufacturing/production events and associated data, such as a manufacturing execution system (MES). Such an MES generally executes above/outside of a control layer of a manufacturing/process control system to record production events and related data. Aspects of the invention relate to modeling the physical assets of an industrial process and the logical relationships between the physical assets in an MES. Using the asset models and relationship models, along with real time or near real time production data for the assets, the MES is able to generate production metrics that accurately reflect the current performance of a logically arranged group of physical assets. The MES can dynamically alter the way it determines production metrics for a group of physical assets as the performance of the individual assets changes.

In one aspect, a manufacturing execution system is configured to provide an indication of the performance of a line in an industrial process. The line includes a plurality of entities. The entities are configured to perform a plurality of jobs to advance production of one or more line outputs. The manufacturing execution system comprises a configuration module comprising a configuration database. The configuration module is operably connected to a configuration display and user interface adapted to receive configuration inputs from a user of the manufacturing execution system. The configuration module is configured to generate a configuration view on the configuration display and to receive the configuration inputs from the user interface. The configuration module is further configured to generate an entity model representative of each of the entities in the line in response to configuration inputs entered into the user interface defining parameters for each of the entities. Each of the entities is configured to perform one of the jobs to advance the production of said one or more line outputs by producing one or more entity outputs from one or more entity inputs. The configuration module is also configured to store each of the entity models in the configuration database and generate a line model representative of the line in response to configuration inputs defining parameters for the line, the entities assigned to the line, and an ordered sequence of the assigned entities. The line model includes an indication of a line position for each of the entities in the line based on the user inputs defining the assigned entities and the ordered sequence thereof. The configuration module is further configured to store the line model in the configuration database. A runtime module is operably connected to a runtime display, the configuration database, and a field input of the industrial process. The runtime module is configured to associate a bottleneck identifier with one or more bottleneck entities using the line position indications and at least one of the defined parameters for at least one of the entities and the defined parameters for the line. The runtime module is also configured to determine a line production metric using production data for the bottleneck entities received from the field input and selectively considered based on the bottleneck identifier associated with the bottleneck entities and display the line production metric on the runtime display to provide an indication to a user of the manufacturing execution system of the performance of the line in the industrial process.

In another aspect, a processor executable method of controlling a line in an industrial process that includes a plurality of entities configured to perform a plurality of jobs to advance production of one or more line outputs comprises generating an entity model representative of each of the entities in the line in response to user inputs defining parameters for each of the entities. Each of the entities is configured to perform one of the jobs to advance the production of said one or more line outputs by producing one or more entity outputs from one or more entity inputs. A line model representative of the line is generated in response to user inputs defining parameters for the line, the entities assigned to the line, and an ordered sequence of the assigned entities. The line model includes an indication of a line position for each of the entities in the line based on the user inputs defining the assigned entities and the ordered sequence thereof. A bottleneck identifier is associated with one or more bottleneck entities using the line position indications and at least one the defined parameters for at least one of the entities and the defined parameters for the line. A line production metric is determined using production data for the bottleneck entities received from the field input and selectively considered based on the bottleneck identifier associated with the bottleneck entities. The line production metric is displayed to a user of the manufacturing execution system to provide an indication of the performance of the line in the industrial process.

In another aspect, a manufacturing execution system is configured to provide an indication of the performance of a line in an industrial process. The line includes a plurality of entities. The entities are configured to perform a plurality of jobs to advance production of one or more line outputs. The manufacturing execution system comprises a configuration module comprising a configuration database. The configuration module is operably connected to a configuration display and user interface adapted to receive configuration inputs from a user of the manufacturing execution system. The configuration module is configured to generate a configuration view on the configuration display and to receive the configuration inputs from the user interface. The configuration module is further configured to generate an entity model representative of each of the entities in the line in response to configuration inputs entered into the user interface. Each of the entities being configured to perform one of the jobs to advance the production of said one or more line outputs by producing one or more entity outputs from one or more entity inputs. Each of the entity models is stored in the configuration database. A line model representative of the line is generated in response to configuration inputs defining parameters for the line, the entities assigned to the line, an ordered sequence of the assigned entities, and one or more of the entities that are production source entities for the line. The line model includes a reference to each of the entity models and an indication of a line position for each of the entities in the line based on the user inputs defining the assigned entities and the ordered sequence thereof. The line model further includes a production source entity indication indicating the entities that are the production source entities based on the user inputs defining the production source entities. The line model is stored in the configuration database. A runtime module is operably connected to a runtime display, the configuration database, and a field input of the industrial process. The runtime module is configured to determine a line production metric using production data for the production source entities received from the field input and selectively considered based on the production source entity indications included in the line model. The line production metric is displayed on the runtime display to provide an indication to a user of the manufacturing execution system of the performance of the line in the industrial process.

Other objects and features will be in part apparent and in part pointed out hereinafter.

BRIEF DESCRIPTION OF THE DRAWINGS

FIG. 6 is a schematic block diagram of a line model stored in the configuration database;

FIG. 7A is an exemplary screenshot of a line model configuration view for configuring parameters of a line model;

FIG. 8 is a flowchart of the steps and decision points of a method of determining the entities in a line that are bottleneck entities;

FIG. 9 is a flowchart of the steps and decision points of a method of determining the production of an entity;

FIG. 12 is a flowchart illustrating the steps of a method of determining a line realization production metric.

Corresponding reference characters indicate corresponding parts throughout the drawings.

DETAILED DESCRIPTION

Figure 1:
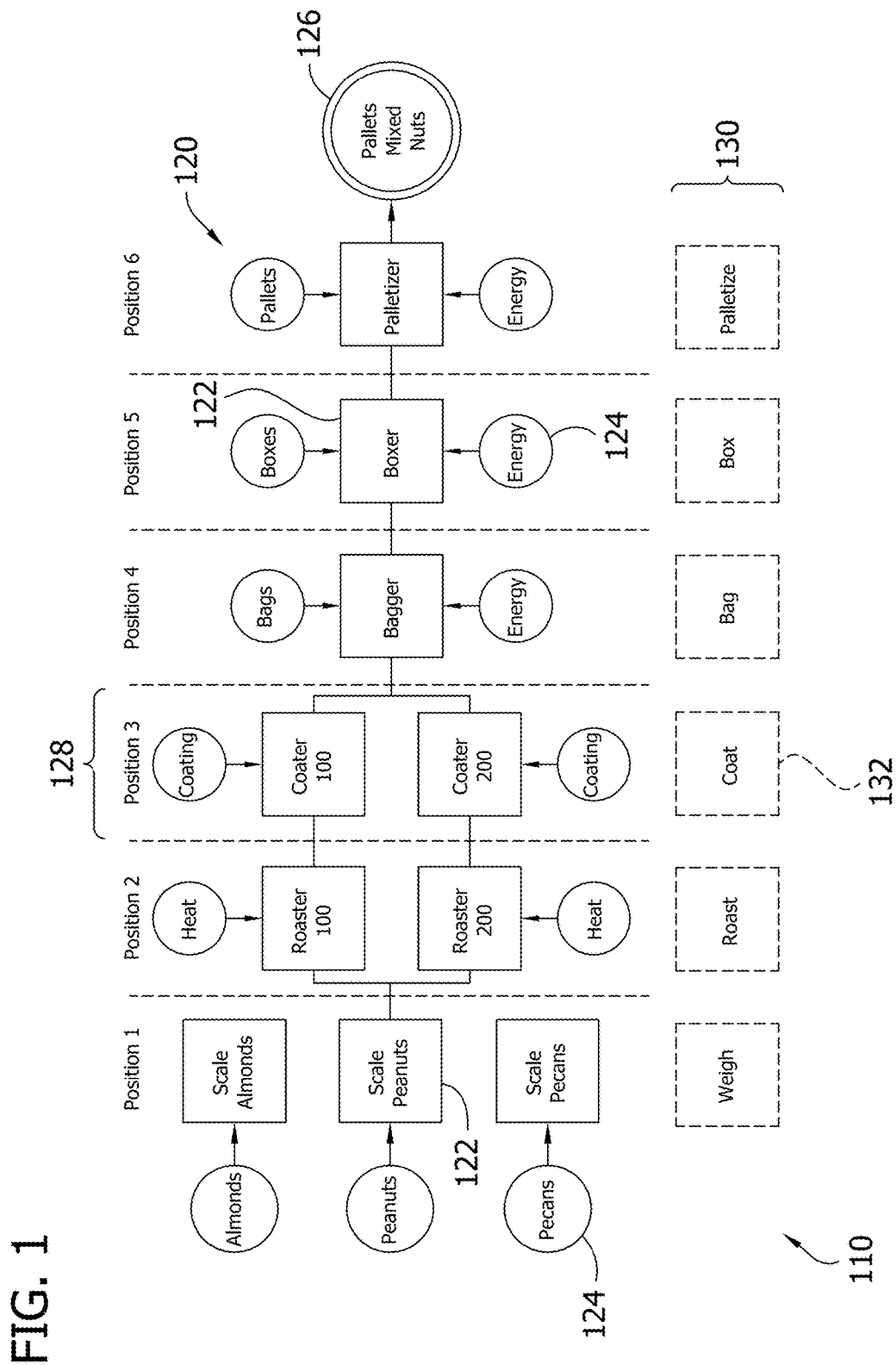
FIG. 1 is a schematic block diagram of an exemplary industrial process.

Referring to FIG. 1, an exemplary industrial process is generally indicated at reference number 110. The illustrated industrial process 110 is a food production facility that produces pallets of mixed nuts. As discussed in further detail below in reference to FIG. 2, an MES 112 monitors the performance of various aspects of the mixed nuts production facility 110 and provides reports on the production performance to a user. It will be understood that the mixed nut production facility 110 is merely one example of the many kinds of industrial processes that can be used with the MES 112. As will be appreciated, the MES 112 models the physical assets in the industrial process 110, as well as the logical relationships between various assets, and generates production metrics representative of the production of logically related groups of physical assets in the industrial process.

Referring to FIG. 1, certain aspects of the industrial process 110 that the MES 112 models and whose performance the MES tracks will now be discussed. It will be understood that, in other embodiments, the MES models and tracks the performance of other aspects of industrial processes without departing from the scope of the invention. For purposes of illustration, the industrial process 110 includes a single production line 120 comprising a plurality of entities 122. A "line" is a sequence of "entities" 122 that perform one or more tasks to transform one or more line inputs (e.g., line inputs 124) to one or more line outputs (e.g., line outputs 126). "Entities" are physical assets in an industrial process whose activity is tracked by the MES 112. In the illustrated industrial process, each of the entities 122 is a piece of equipment that performs discrete tasks. But in other embodiments, an "entity" can be an entire plant, an area of a plant (e.g., a production floor or warehouse), an organizational group of machines (e.g., those in a particular department), a piece of equipment (e.g., a mixer, dispenser, palletizer, etc.), or a component module of a piece of equipment. When an entity 122 is a component of a line 120, the entity is understood to be the child of the line and the line is understood to be a parent to the entity.

The terms "line" and "entity" refer to how an MES interacts with the physical assets they describe. Certain physical assets function as a line or an entity, depending on how the MES models them and tracks their performance. For example, in certain MES configurations, a line is a group of machines that, in the physical industrial process, perform an ordered sequence of tasks. Other configurations of the MES can treat the same group of machines as a single "entity" for purposes of tracking the performance of the industrial process. In such a configuration, the MES monitors and reports the production of the group of machines as a whole, rather than tracking the incremental production of each machine in the group separately. To the extent the MES monitors and reports the production of separate entities and also recognizes the logical arrangement of the separate entities in an ordered group, the group of entities is treated as a "line."

In the illustrated industrial process 110, the production line 120 includes several entities 122 that operate in sequence to produce pallets of mixed nuts 126. Various line inputs 124 such as ingredients, energy, packaging, etc. are processed to produce the pallets of mixed nuts 126. The MES categorizes the entities 122 by line position 128. In certain configurations, the MES 112 groups two or more parallel entities 122, such as the scale entities in FIG. 1, in the same line position 128. In addition, the MES can structure a line 120 so that single entities 122 are arranged in sequence, with each entity occupying its own line position 128. The entities 122 at each line position 128 receive entity inputs and produce entity outputs (e.g., the boxer entity produces boxes of mixed nuts as an entity output) to advance the production of the line outputs 126. Entity inputs include line inputs 124 or the entity outputs from an entity in the immediately prior line position 128.

To produce line outputs 126 from line inputs 124, the line 110 processes a work order 130. The work order 130 is a sequence of one or more jobs 132 that entities 122 perform to produce line outputs 126 from line inputs 124. A work order 130 can run on any line 120 that has entities 122 capable of carrying out its jobs 132. At runtime, a work order 130 is assigned to a line 120, and one or more entities 122 on the line perform the jobs 132, thereby carrying out the work order. The MES 112 preferably tracks the progress and status of each work order 130 and job 132 in real time or near real time.

Figure 2:
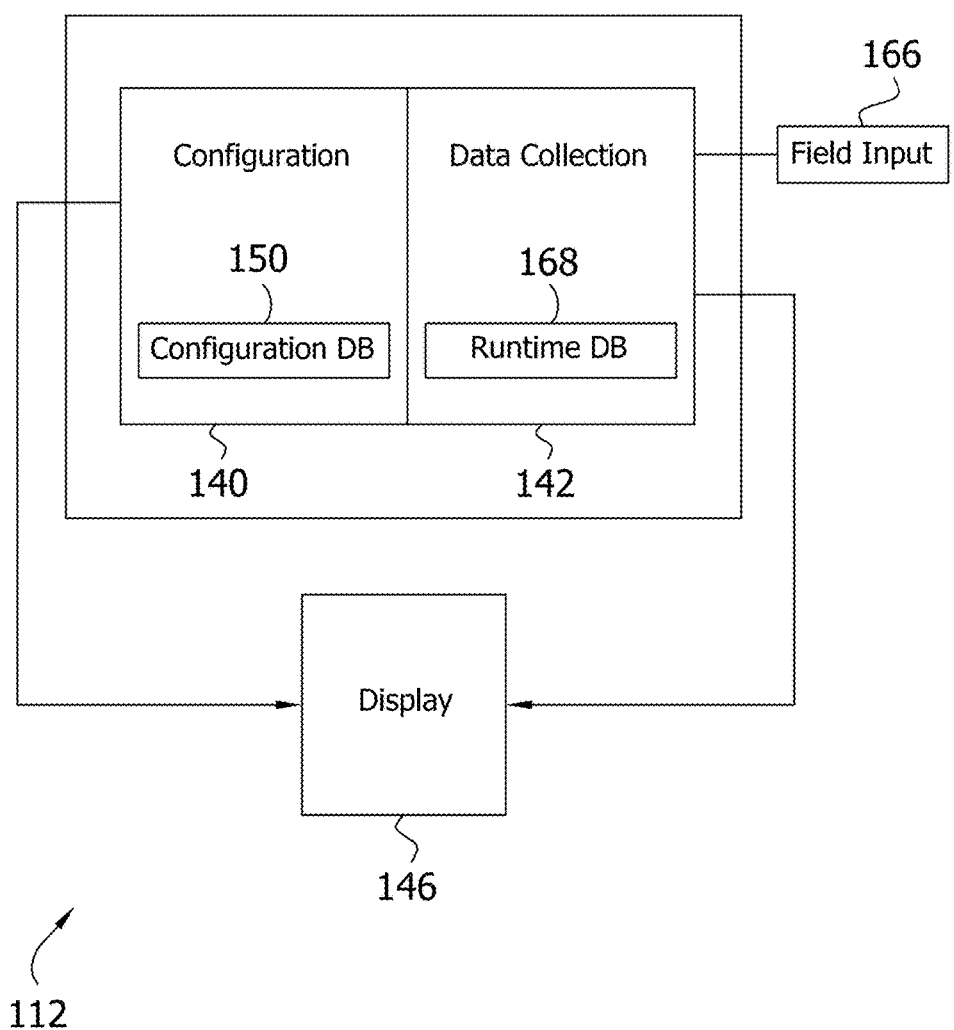
FIG. 2 is a schematic block diagram of an MES.

As will be discussed in further detail below, the MES 112 is configured to provide users with an indication of the performance of the line 120. Referring to FIG. 2, the MES 112 is operatively connected to one or more field inputs 166 in the industrial process 110. The field inputs 166 provide real time or near real time data from the floor of the industrial process 110 to the MES. The field inputs 166 are provided by one or more sensors associated with the entities 122 and/or input by human operators. In general, the field inputs 166 provide data about the performance of the entities 122 (broadly, production data) as they perform their jobs 132. The field inputs 166 can produce—and the MES 112 can process—different types of production data to generate production metrics for the entities 122 and lines 120 in the industrial process 110.

For example, in certain exemplary embodiments, the field inputs 166 provide production counts data, which measures the amount of entity outputs being produced by the entity 122. The field inputs 166 provide production counts data in different standard units for different entities 122 in the same line 120. Typically, the field inputs 166 provide production counts data in units related to the entity outputs that the respective entities produce. For example, in some embodiments, one or more field inputs 166 for the bagger entity 122 generate production counts data in standard units of bags of mixed nuts, whereas field inputs for the boxer entity generate production counts data in standard units of boxes of mixed nuts. The field inputs 166 are preferably configured to generate different types of production counts data for the same entity 122. For example, in one or more embodiments, the field inputs 166 for each entity 122 generate good production counts data, which measure the number of acceptable entity outputs produced by the entities 122, and rejected production counts data, which measure the number of unacceptable entity outputs produced by the entities. Whether an entity output is "acceptable" or "unacceptable" depends on quality standards specific to an industrial process 110.

In the illustrated embodiment, the field inputs 166 can also provide production time data, which measure the amount of time the entities 122 spend producing entity outputs. In a preferred embodiment, the field inputs 166 provide both runtime data, which are used to determine the amount of time the entities 122 are functioning properly while producing entity outputs, and downtime data, which are used to determine the amount of time the entities 122 are functioning improperly. Again, whether an entity is functioning "properly" or "improperly" depends on quality standards specific to each industrial process. Generally, the MES 112 distinguishes between entities 122 that are running improperly and entities that are disabled. A disabled entity 122 is typically one that is taken out of service and/or otherwise treated as absent from the industrial process 110 for any reason; an entity 122 that is running improperly is an entity that is treated as an operational asset in the industrial process 110 but is not achieving the desired operational qualities for the entity.

As will be discussed in further detail below, the MES 112 models the relationships between the entities 122 in the line 120 so that, using production data for the entities, the MES can evaluate the performance of the line as a whole. In general, the MES 112 determines which of the entities 122 on the line 120 limit the performance of the line and identifies these entities as bottleneck entities. The bottleneck entity 122 is the entity or set of parallel entities in a line 120 that have the lowest normalized production rate, and thus limit the rate at which the entire line can produce items. As discussed below, the MES 112 can, in some configurations, evaluate the jobs 132 assigned to each entity 122 to determine which entity or parallel set of entities have the lowest normalized production rate at any given time. After making this determination, the MES 112 identifies the entity or parallel set of entities 122 with the lowest normalized production rate (or sum of production rates, if entities are in parallel) as bottleneck entities and uses their production rate when evaluating the overall performance of the line 120.

In addition to using identified bottleneck entities 122 to evaluate the performance of a line 120, the MES 112 is also configured to identify one or more "production source entities" that are used to evaluate the performance of a line. Whereas bottleneck entities 122 refer to those entities that limit the speed at which the line 120 can produce line outputs 126, production source entities are those entities whose entity output production is most representative of the production of the line 120. Typically production source entities 122 will be the farthest downstream entity or parallel set of entities on the line 120 that are capable of reporting production data. These entities 122 provide a better indication of the production of the line 120 than upstream entities that report production because production defects can arise at any line position 128. That is, the downstream entities 122 provide a useful indication of the production of the line because any rejected entity outputs produced upstream of those entities will not be included in the production data for the downstream entities.

Referring further to FIG. 2, the illustrated MES 112 includes tools for modeling various aspects of the industrial process 110, as well as tracking and reporting the production of the industrial process in operation. The MES 112 includes a configuration module 140 for configuring and storing models of various aspects of the industrial process 110 and a runtime module 142 for receiving and storing data about the performance of the industrial process. Each of the configuration and runtime modules 140, 142 is operably connected to one or more displays 146 to generate configuration and runtime views through which an MES user can interact with the configuration and runtime modules. In certain embodiments, the MES is operatively connected to separate configuration and runtime displays 146. In other embodiments, a single display displays both configuration views and runtime views, acting as both a configuration display and a runtime display.

The configuration module 140 is configured to model aspects of the industrial process 110 and to store the models in a configuration database 150. The configuration module 140 is operably connected to a configuration display 146 and to a user interface adapted to receive configuration inputs from a user of the MES 112. In certain embodiments the configuration display 146 and user interface comprise a work station in the industrial process such as a desktop or laptop computer, etc. The configuration module 140 is configured to generate one or more configuration views on the configuration display. The configuration views preferably prompt an MES user for parameters used to generate models of various aspects of the industrial process 110. The MES user delivers the inputs to the configuration system through the user interface at the configuration display 146. The configuration module 140 is configured to receive the configuration inputs and to generate models of the industrial process 110 based on the user inputs.

Figure 3:
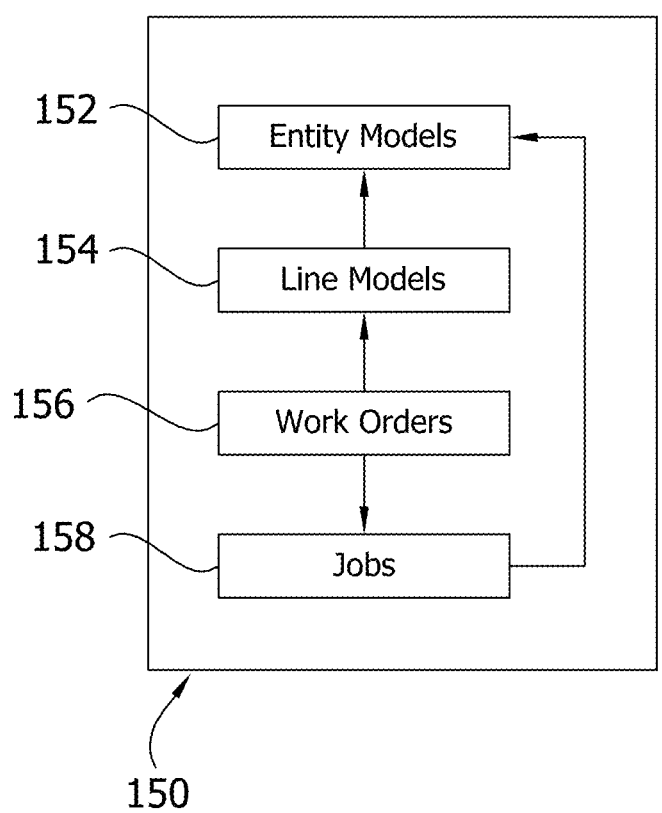
FIG. 3 is a schematic block diagram of a configuration database of the MES.

As shown in FIG. 3, the illustrated configuration database 150 stores one or more entity models 152, line models 154, work order models 156, job models 158, and the like. In other embodiments, the configuration database 150 stores models of other aspects of the industrial process 110 without departing from the scope of the invention. In one or more embodiments, each of the models 152, 154, 156, 158 stores various user-defined parameters about the aspect of the industrial process 110 it represents. Preferably, the configuration database 150 stores relationships between the models 152, 154, 156, 158 that reflect the actual relationships between the physical assets in the industrial process 110. For example, for an entity 122 that is a child of a line 120, the configuration database 150 stores an indication of a parent-child relationship between the respective entity model 152 and line model 154 as well as the line position 128 of the entity on the line. The configuration database 150 also stores an indication of the parent-child relationships between a work order 130 and its constituent jobs 132. When a work order 130 is assigned to a line 120, the configuration database 150 preferably stores an indication of the relationship between the respective line model 154 and work order model 156, as well as job models 158 and entity models 152.

In an exemplary embodiment, the configuration database 150 is an SQL database and each of the models 152, 154, 156, 158 comprises one or more records in the database with unique primary key identifiers. The database 150 uses foreign key identifiers, which reference the primary key identifiers of related SQL records, to store relationships between the models 152, 154, 156, 158. As discussed in further detail below, the runtime module 142 is configured to use the user-defined parameters in entity models 152 and line models 154, stored indications of relationships between entities 122 and lines 120, and, in some cases, production data from the field inputs 166 to determine which of the plurality of entities in a line are the bottleneck entities for the line and generate one or more production metrics for the line.

Figure 4:
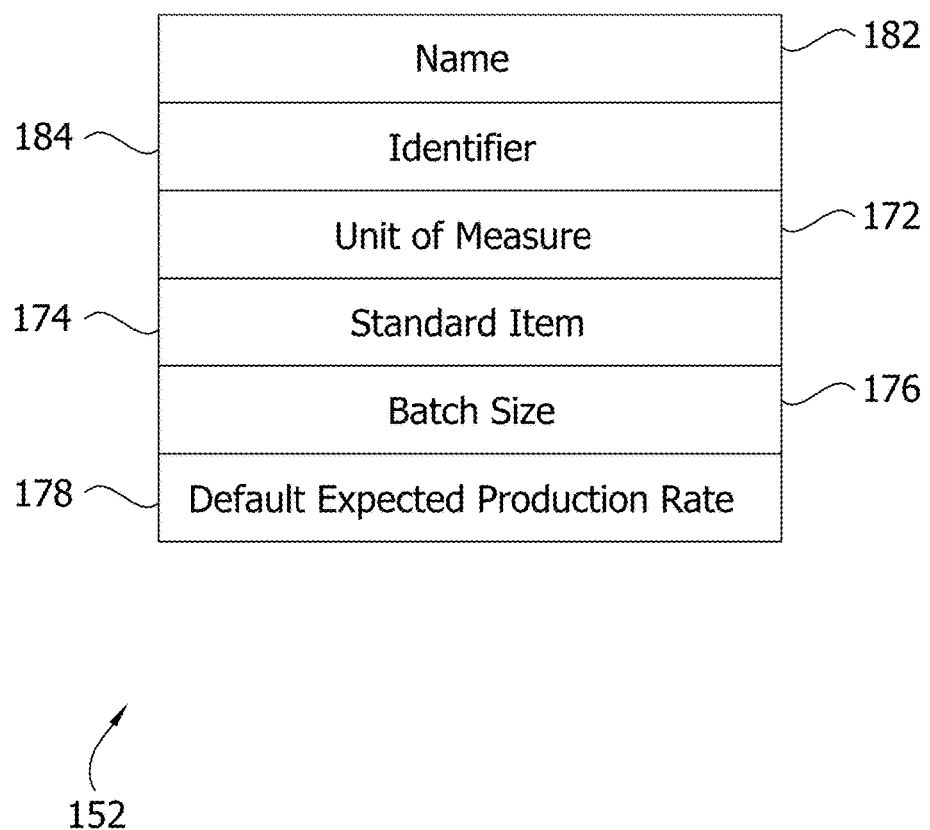
FIG. 4 is a schematic block diagram of an entity model stored in the configuration database.

Referring to FIG. 4, the configuration system 140 is configured to generate an entity model 152 representative of each of the entities 122 in a line 120 in response to user-supplied configuration inputs entered defining parameters for the entities. The configuration system 140 stores the user defined parameters in entity models 152 in the configuration database 150. In the illustrated embodiment, each entity model 152 includes a unit of measure parameter 172, which defines the units for an expected production rate for jobs 132 run on the entity 122. The entity model 152 also includes a standard item parameter 174, which defines the type of entity output produced by the entity. A default batch size parameter 176 of the entity model 152 defines how many of the standard items the entity produces in a single batch. The entity model 152 also includes a default expected production rate parameter 178, which defines a baseline, expected rate of production for the entity. The default expected production rate parameter 178 is a default estimate of the production rate for the entity 122 when it is not known what specific jobs 132 are to be run on the entity.

In an embodiment, job models 158 preferably include job-specific estimates of the production rate for the entity 122 upon which the job 132 is to be run. As will be discussed in further detail below, the job specific estimate of the production rate for the entity 122 is considered a better approximation of the production rate for the entity at any given time and, if available, supersedes the default production rate parameter 178 for purposes of comparing the normalized expected production rates of the entities when determining the source of bottleneck for a line 120. Along with the measurement parameter fields 172, 174, 176, 178, the entity model 152 also includes a name field 182, where the model stores a user-supplied name, and a primary identification field 184, which provides an identification of the entity model 152 that distinguishes the model from all other models stored in the configuration database 150. It will be understood that, in other embodiments, entity models include additional and/or different parameters without departing from the scope of the invention.

Figure 5:
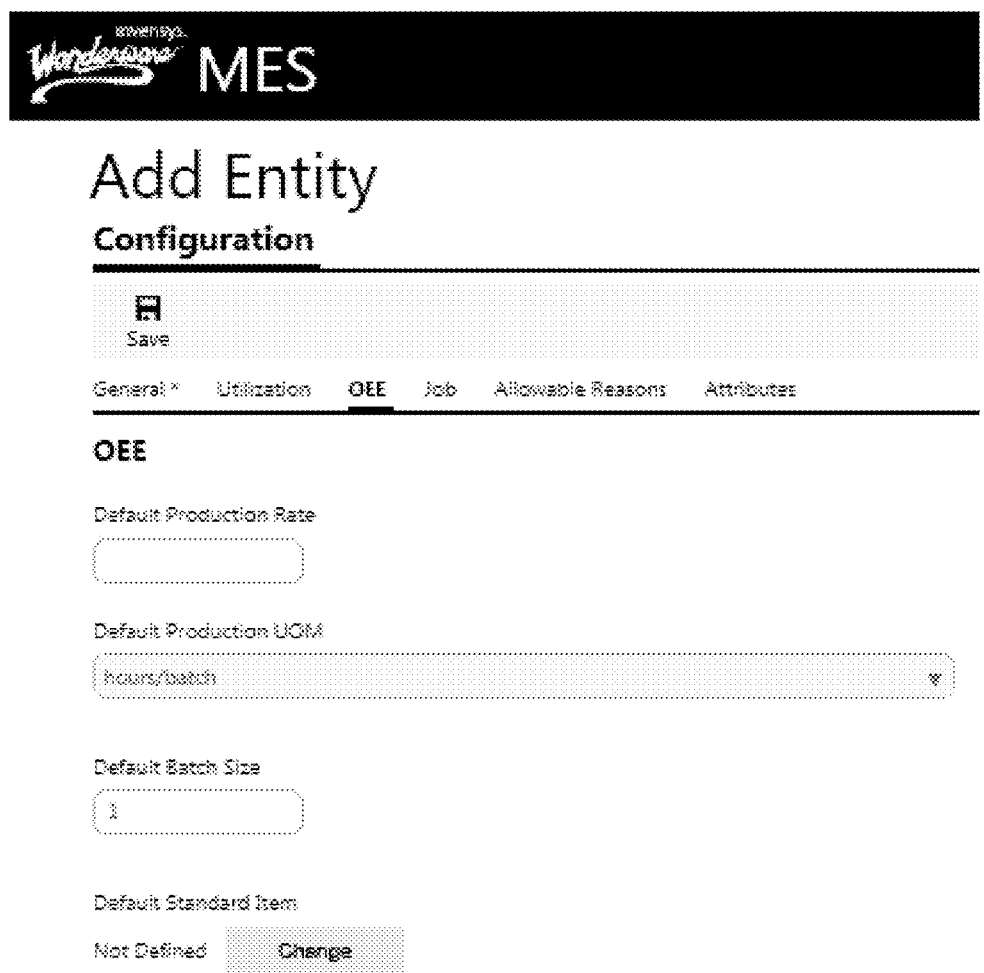
FIG. 5 is an exemplary screenshot of an entity model configuration view.

As shown in FIG. 5, an exemplary configuration view 180 includes display fields that prompt an MES user for the information required to populate the measurement parameter fields 172, 174, 176, 178 of the entity model 152. Another entity model configuration view (not shown) includes a field for naming the entity model 152 (which populates the name field 182). Preferably, the configuration module 140 automatically populates the primary identification field 184 with a suitable unique identifier. The configuration view 180 is merely one example of a suitable way of prompting an MES user for inputs that define the parameters of an entity model 152. Other configuration views can also be used without departing from the scope of the invention.

Figure 7B:
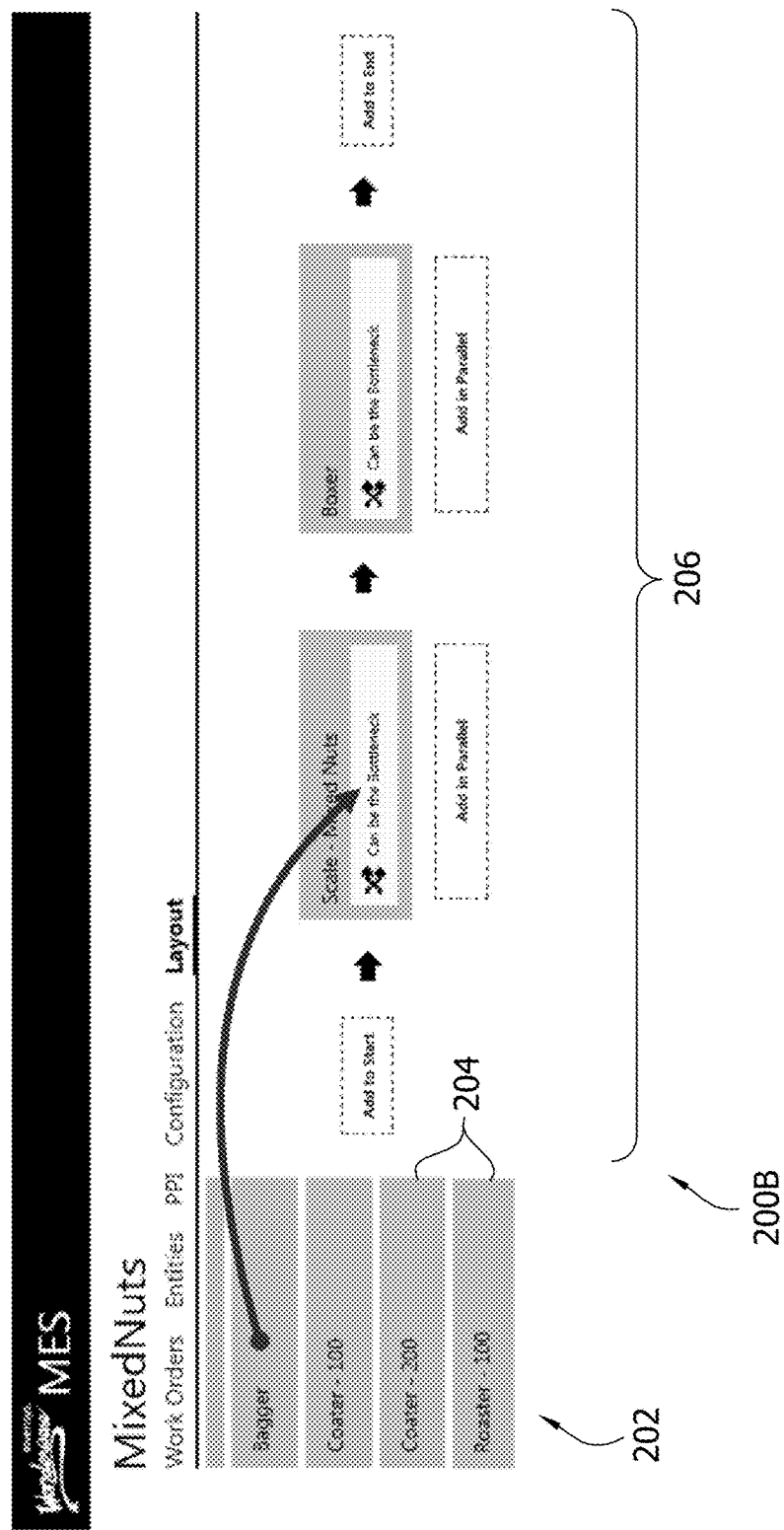
FIG. 7B is an exemplary screenshot of another line model configuration view for associating entities with a line and modeling the arrangement of entities on the line.

Referring to FIG. 6, the configuration system 140 is configured to generate a line model 154 representative of each line 120 in an industrial process 110 in response to configuration inputs entered into a user interface associating entities 122 with the line and arranging the entities in an ordered sequence. As shown in FIGS. 7A and 7B, the visualization system 144 generates line model configuration views 200A, 200B that enable an MES user to define line parameters (FIG. 7A) and assign an ordered sequence of entities to the line model 154 (FIG. 7B). In the illustrated embodiment, the configuration view 200A includes fields for receiving user inputs of parameters for the line model 154. The configuration view 200B includes an entities palette 202 with graphical objects 204 depicting the entities 122 that are represented as entity models 152 in the configuration database 150. A user may select the appropriate graphical objects 204 and place them on the work area 206 to create a representation of the ordered sequence of entities 122 in a line 120. Based on the inputs provided at the configuration views 200A, 200B, the configuration system 140 stores the line models 154 in the configuration database 150 after they are created. Preferably, the configuration view 200B also includes tools (not shown) that allow a user to provide inputs indicating whether an entity 122 in a line 120 is capable of being a bottleneck entity for the line, cannot be a bottleneck entity for the line, or must be the bottleneck entity for the line. Likewise, the configuration view 200B also includes tools for selecting the entity 122 or parallel set of entities at a line position 128 that serve as the production source entities for the line. A user selects the entity/entities 122 that are the production source entities and the MES 112 uses the selection to evaluate the performance of the line 120 as discussed in further detail below.

Referring again to FIG. 6, in the illustrated embodiment, each line model 154 includes a unit of measure parameter 212, which defines the units by which the MES 112 reports production rate data for a line 120. As discussed in further detail below, the MES 112 is configured to convert the unit of measure parameter 172 for the expected production rate parameter 122 to the unit of measure parameter 212 for a line or the unit of measure parameter for another entity. This process of normalizing the units used to report production data enables the MES 112 to perform operations involving the production rate data of entities 122 and lines 120 that have production rate data defined in different units of measure. The line model 154 also includes a standard item parameter 214, which defines the type of line output 126 produced by the line 120. A batch size parameter 216 of the line model 154 defines how many of the standard items the line 120 produces in a single batch. Any of the measurement parameters 212, 214, 216, can be null if the line 120 does not require them to report production data. Along with the measurement parameter fields 212, 214, 216 the line model 154 also includes a name field 222, where the model stores a user-supplied name, and a primary identification field 224, which distinguishes the line model from all other models stored in the configuration database 150. The line model 154 also includes a bottleneck line position field 226, which identifies the user-supplied line position 128 that includes the bottleneck entities 122 for a line 120. The bottleneck line position field 226 is only used when the user specifies the line position 128 that contains the bottleneck entities 122. It will be understood that line models may include different parameters without departing from the scope of the invention. The line model 152 also includes a production source entities field 228. The production source entities field 228 is an identifier that points to the line position of the entity or entities that are the production source entities for the line 120. As discussed above, the MES user defines which entities are the production source entities for the line 120 in the illustrated MES 112.

The line model 154 stores indications of the relationship between the line 120 and its constituent entities 122. In the illustrated embodiment, the line model 154 includes a plurality of records in the configuration database 150. A definitions record 230 of FIG. 6 stores the identification parameters 222, 224, measurement parameters 212, 214, 216, and predefined bottleneck parameter 226 for the line model 154, and a plurality of linking records 232 store indications of the relationships between the line 120 and its constituent entities 122 (there is one linking record per entity in a line) and the relative positioning of the entities on the line. Each linking record 232 has its own primary key identifier 233, which distinguishes it from all other records in the configuration database. Each linking record 233 also includes a first foreign key identifier 234, which references the primary key identifier of the definitions record 230 for the line, and a second foreign key identifier 236, which references the primary key identifier of an entity model 252 representative of an entity 122 in the line 120. Together, the first and second foreign key identifiers 232, 234 map the line model 154 to a related entity model 152. Although the illustrated configuration database 150, uses a line model 154 made up of definitions and linking records 230, 232 to store relationships between lines 120 and entities 122, it will be understood that other configuration databases can store relationships between lines and entities in other ways without departing from the scope of the invention.

The line model 154 also includes indications of the line position 128 of each of the entities 122 in the line 120 that are based on the user inputs assigning each of the entity models to a respective line position (e.g., arranging the graphic objects 204 on the work area 206 of the configuration view 200B (FIG. 7B)). Each linking record 232 as shown in FIG. 6 includes a line position field 238. The illustrated configuration system 140 populates the line position field 238 with an integer (broadly, a line position indicator) representative of the line position 128 of the entity 122 represented by the model 152 referenced by the second foreign key identifier 236. Though the illustrated configuration database 150 uses line position fields 238 of linking records 232 to store indications of the line positions of entities 122 in a line 120, other configuration databases can include other indications of line position without departing from the scope of the invention.

The linking records 232 also store parameters used to determine which of the entities 122 in a line 120 are bottleneck entities when the user does not specifically define the line position that must contain the bottleneck entities. As will be discussed in further detail below, after the MES 112 has determined which of the entities 122 in a line 120 are bottleneck entities, it uses the production data for the bottleneck entities and, in some cases, the production data of other entities in the line to evaluate the production performance of the whole line. In the illustrated embodiment, each linking record includes a bottleneck field 242 that indicates whether the entity 122 represented by the entity model 152 whose primary key identifier 184 is included in the second foreign key identifier field 236 of the linking record 232 is capable of being a bottleneck entity. If the MES user has indicated that a line position 128 must contain the bottleneck entities, the bottleneck field 242 of each of the linking records 232 indicates that the respective entities are not capable of being the bottleneck entities.

Referring again to FIG. 2, the runtime module 142 is operably connected to the field inputs 166 of the industrial process 110, the configuration database 150, and a runtime display 146 to receive, store, and visually present data about the performance of the industrial process. The field inputs 166 provide real time or near real time data from the floor of the industrial process 110 to the data collection module 142, and the data collection module stores the data in a runtime database 168. The runtime module 142 assigns work orders 130 to lines 120 and manages the queuing of jobs 132 to entities 122. As discussed in further detail below, the runtime module 142 uses parameters stored in the entity models 152, line models 154, and job models 158 of the configuration database to determine which of the entities 122 in a line 120 are the bottleneck entities. The runtime module 142 associates a bottleneck identifier with the entity models 152 of the determined bottleneck entities. And after the bottleneck entities 122 are determined and identified, the runtime module 142 uses the production data received from the field inputs 166 for the bottleneck entities to determine production metrics for the entire line 120, displaying the production metrics on a runtime display 146.

As shown in FIG. 8, the runtime module 142 is configured to perform a method of determining the bottleneck entities 122 in a line 120. Initially, at decision block 802, the runtime module 142 determines whether the user has manually identified the bottleneck entities 122 for the line 120. If the source of bottleneck is manually specified (e.g., if the bottleneck line position field 226 in the line definitions record 230 is populated), the runtime module 142 determines that the entities 122 at the user-selected line position 128 are the bottleneck entities (step 804). If the bottleneck is not previously defined by the user, the runtime module 142 dynamically determines which entities 122 are the bottleneck entities. As discussed above, each linking record 232 of a line model 150 includes a bottleneck field 242 that indicates whether the referenced entity 122 is capable of being a bottleneck entity. At step 806, the runtime module 142 determines which of the entities 122 are capable of being the bottleneck based on the bottleneck fields 242. At step 808, the runtime module 142 determines the production rate for each of the entities 122 that can be the bottleneck.

The runtime module 142 preferably uses the expected production rate for each of the entities 122 based on the jobs 132 that are currently assigned to the entities, the jobs that are queued to be assigned to the entities, or the entities' default production rates 178. Referring to FIG. 9, in certain embodiments, the runtime module 142 uses a method of determining a production rate 900 to determine the production rate for each entity 122 that can be a bottleneck entity when carrying out step 808 of the method 800. Again, each job model 158 representative of a job 132 preferably includes an expected production rate for the job, which may be different than the default production rate 178 stored in the entity model 152. As will be apparent, for each entity 122, the runtime module 142 preferentially uses the expected production rates for running jobs 132, the expected production rates for queued jobs, and the default expected production rate for the entity to determine the expected entity production rate used to determine the source of bottleneck.

At decision block 902 of FIG. 9, the runtime module 142 determines whether an entity 122 is currently assigned any jobs 132. If the entity 122 is currently assigned one or more jobs 132, at decision block 903, the runtime module determines whether the entity 122 is running more than one job 132. If the entity 122 is running more than one job 132, the runtime module 142 uses the lowest expected production rate of the running jobs as the production rate for the entity when determining the source of bottleneck at step 904. If the entity 122 is running only one job 132, the expected production rate for that job is used at step 905. If the entity 122 is not currently running jobs 132, at decision block 906, the runtime module 142 determines whether there are any jobs queued for the entity. If so, the runtime module 142 uses the expected production rate for the next job 132 that is expected to run to determine whether the entity 122 is a bottleneck entity (step 912); if not, the runtime module uses the default expected production rate 178 for the entity 122 (step 914).

Referring again to FIG. 8, after the runtime module 142 has determined a production rate for each of the entities 122 that can be a bottleneck entity (step 808), the runtime module 142 normalizes the expected production rates of the potential bottleneck entities (step 810). In certain embodiments, the runtime module 142 normalizes the production rates for the entities to each have the unit of measure defined in the unit of measure field 212 of the line model 154. In other embodiments, the runtime module can normalize the expected production rates to a different unit of measure without departing from the scope of the invention.

At step 812, after normalizing the expected production rates, the runtime module 142 determines a total expected production rate for each line position by adding together the production rates of the parallel entities 122. A bottleneck of a line 120 usually refers to the line position 128 with the lowest expected production rate, since multiple entities at a single line position 128 operate in parallel. The runtime module 142 preferably excludes any disabled entities 122 from the total expected production rate of each line position because disabled entities are not expected to add to the production of a line position 128 while they are disabled. After calculating the expected production rates for each line position 128 of the line 120, the runtime module 142 determines which of the line positions 128 contains the bottleneck entities 122 (step 814). The bottleneck line position 128 is the line position with the lowest expected production rate. But if two or more of the line positions 128 both have the lowest expected production rate, the runtime module 142 determines that the furthest downstream of those line positions contains the bottleneck entities 122. At step 816, the runtime module 142 associates a bottleneck identifier with each of the entity models 152 that represent the bottleneck entities 122.

For certain production metrics, the runtime module 142 uses the bottleneck identifier to select the production data to use when evaluating the performance of a line 120. For these performance metrics, the runtime module generally selects the production data for the entities associated with the bottleneck identifier and uses the selected data to determine the production metric. The production data for other entities is also sometimes used. For example, in some embodiments, the runtime module 142 selects the production data for the production source entities based on the production source entity parameter 228 of the line model 154 (broadly, a production source entity indication) and uses the production data to determine a production metric. The production data for still other entities 122 can be selected and used to determine a production metric without departing from the scope of the invention. After determining the line production metric, the runtime module 142 is configured to display the line production metric on the runtime display 146 to provide an indication to an MES user of the performance of the line 120 in the industrial process 110. In certain embodiments, the runtime module 142 is operatively connected to a supervisory control system that operates the line 120. In these embodiments, the runtime module 142 can be configured to automatically adjust the operation of the line 120 through the supervisory control system based on the determined production metric for the line. In other embodiments, an MES user directs adjustments to be made to the operation of the line 120 through the supervisory control system based on the determined production metric for the line. As will be discussed below, exemplary line production metrics include line availability, line production quality, and line production realization. But the runtime module 142 can also determine other line production metrics without departing from the scope of the invention. In certain suitable embodiments, the runtime module 142 uses production data including production time data and production counts data, which are discussed above, to determine the production metric for the line. Other types of production data is used in other embodiments without departing from the scope of the invention.

Figure 10:
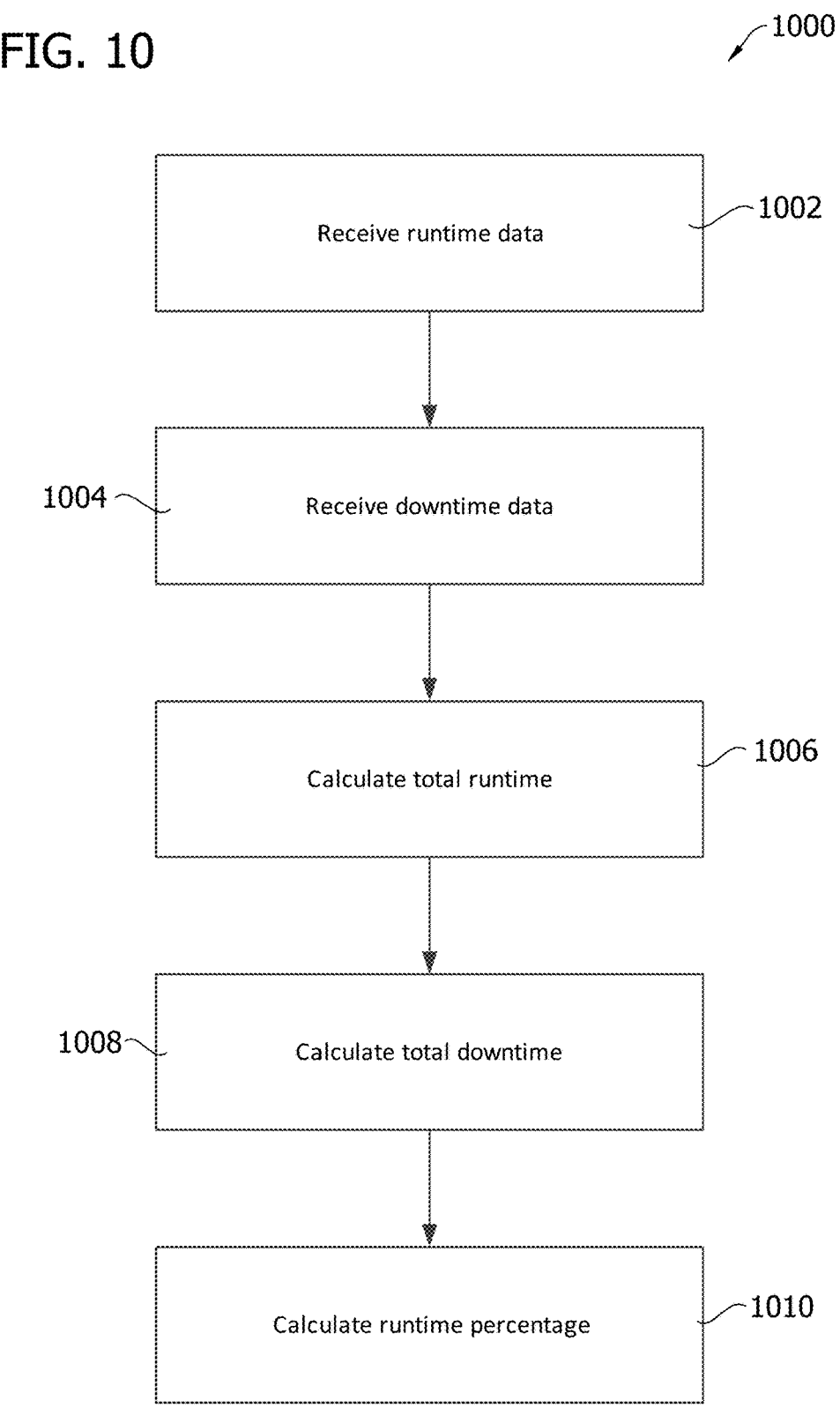
FIG. 10 is a flowchart illustrating the steps of a method of determining a line availability production metric.

Referring to FIG. 10, a suitable method of determining a line availability production metric 1000 will now be discussed. It will be understood that other methods of determining a line availability production metric may also be used without departing from the scope of the invention. Generally, the line availability production metric measures the percentage of time a line 120 is available for producing line outputs 126 during a defined performance monitoring interval. At step 1002, the runtime module 142 receives from the field inputs 166 runtime data for each of the bottleneck entities 122 during the performance monitoring interval. At step 1004, the runtime module 142 receives from the field inputs 166 downtime data for each of the bottleneck entities 122 during the performance monitoring interval. As discussed below, the runtime module 142 is configured to determine the line availability production metric as a function of the received runtime data and downtime data for the bottleneck entities 122. The runtime data can be used to determine an amount of time during the monitoring interval during which each bottleneck entity was available, and the downtime data can be used to determine an amount of time during the monitoring interval during which each bottleneck entity was unavailable. Preferably, the runtime module 142 excludes disabled bottleneck entities from the calculation of downtime because disabled entities are not included in the total expected production rate for a line position 128 when determining which of the line positions contain the bottleneck entities. In certain embodiments, the runtime and downtime data include only an indication of when the entity 122 switches between available and unavailable. In these embodiments, the runtime module 142 tracks the amount of time each bottleneck entity 122 is available or unavailable.

After receiving the runtime and downtime data for each of the bottleneck entities, at step 1006, the runtime module 142 calculates the total amount of runtime for all of the bottleneck entities 122 during the performance monitoring interval. Subsequently, at step 1008, the runtime module 142 calculates the total amount of downtime for all of the bottleneck entities 122 by adding together the downtime amounts for each of the bottleneck entities over the performance monitoring intervals. Once the total runtime and total downtime values are known, the runtime module 142 calculates the line availability production metric as a runtime percentage, according to equation 1 below (step 1010). The runtime module 142 then displays the line availability production metric on a runtime display 146.

$$\text{Availablity} = \frac{\text{Total Runtime}}{(\text{Total Runtime} + \text{Total Downtime})} \quad \text{Equation 1}$$

In some instances, the entities 122 that are the bottleneck entities can change during the performance monitoring interval. In these instances, the runtime module 142 is configured to measure the runtime and downtime for each bottleneck entity 122 during the period in which it is a bottleneck entity and to add together the runtime and downtime totals for all of the different bottleneck entities during their respective segments of the performance monitoring interval. With the total runtime and total downtime for the performance interval known, the runtime module 142 uses Equation 1 to determine the line availability production metric for the line 120.

Figure 11:
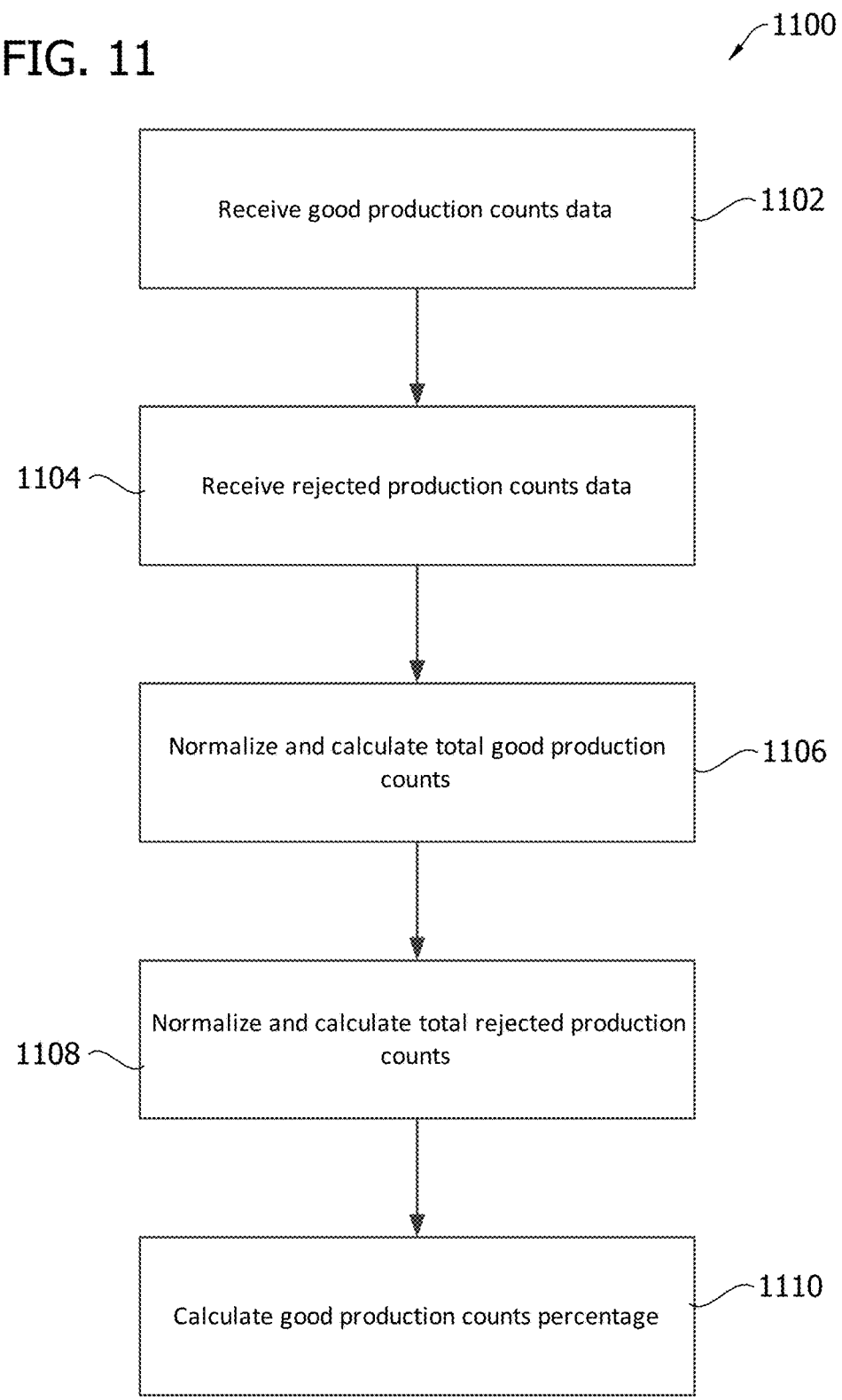
FIG. 11 is a flowchart illustrating the steps of a method of determining a line production quality metric.

Referring to FIG. 11, a suitable method of determining a line production quality metric 1100 will now be discussed. It will be understood that other methods of determining a line production quality metric may also be used without departing from the scope of the invention. Generally, the line production quality metric measures the percentage of the total line production that is considered acceptable over the course of a defined performance monitoring interval. Since the line production quality metric is a function of the total line production, the production data for the production source entities (identified in the field 228 of the line model 154 (FIG. 6)) are used in determining the metric. At step 1102, the runtime module 142 receives from the field inputs 166 good production counts data for each of the production source entities 122 during the performance monitoring interval. At step 1004, the runtime module 142 receives from the field inputs 166 rejected production counts data for each of the production source entities 122 and each of the entities upstream of the production source entities in the line 120. As discussed below, the runtime module 142 is configured to determine the line availability production metric as a function of the received good production counts data and rejected production counts data. The good production counts data includes the number of acceptable entity outputs produced by the production source entities 122 during the performance monitoring interval, which approximates the good production of the line 120. The rejected production counts data includes the number of unacceptable entity outputs produced by the production source entities and the upstream entities during the performance monitoring interval. The runtime module measures the good and rejected production counts for the production source entities 122 and the upstream entities based on the user-defined standard item parameter 174 for the respective entity. The system preferably normalizes the good and rejected production counts for the production source entities and the upstream entities 122 to match the standard item parameter 214 for the line 120 or some other standard item.

After good and rejected production counts data are received from the field inputs 166 and normalized, at step 1106 of FIG. 11, the runtime module 142 calculates the total amount of good production counts for all of the production source entities 122 during the performance monitoring interval. To do so, the runtime module 142 preferably adds together the normalized good production counts for each of the production source entities 122 over the performance monitoring interval. Subsequently, at step 1108, the runtime module 142 calculates the total amount of rejected production counts for all of the production source and upstream entities 122 by adding together the normalized rejected production counts for each of the entities during the performance monitoring interval. Once the good and rejected production counts are known, the runtime module 142 calculates the line production quality metric as a good production counts percentage, according to equation 2 below (step 1110). The runtime module 142 then displays the line production quality metric on a display.

$$\text{Quality} = \frac{\text{Total Good Production Counts}}{\left(\begin{array}{c}\text{Total Good Production Counts} + \\ \text{Total Rejected Production Counts}\end{array}\right)} \quad \text{Equation 2}$$

Referring to FIG. 12, a suitable method of determining a line production realization metric 1200 will now be discussed. It will be understood that other methods of determining a line production realization metric may also be used without departing from the scope of the invention. Generally, the line production realization metric measures the extent to which the actual production counts for a line 120 meet or exceed the expectations for the line. At step 1202, the runtime module 142 receives from the field inputs 166 good production counts data for each of the production source entities 122 during the performance monitoring interval. At step 1204, the runtime module 142 receives from the field inputs 166 rejected production counts data for each of the production source entities 122 and each of the entities upstream of the production source entities in the line 120. At step 1205, the runtime module 142 queries the configuration database 150 for the default expected production rate parameter 178 for the bottleneck entities 122 and the default batch size 176 for the bottleneck entities.

After collecting good and rejected production counts data from the field inputs 166, at step 1206, the runtime module 142 calculates the total amount of good production counts for all of the production source entities 122. Preferably, the runtime module 142 normalizes the collected good and rejected production counts data to the standard item for the line 120, which is defined in field 214 of the line model 154. To do so, the runtime module converts the good and rejected production counts for the entities 122 from standard item 174 for the entities to the standard item 214 for the line 120. After normalizing the good and rejected production counts data, the runtime module 142 adds together the good production counts for each of the production source entities 122 over the performance monitoring interval (steps 1206, 1207). Subsequently, at step 1209, the runtime module 142 calculates the expected production counts for the line 120 by multiplying the default expected production rate 178 for the bottleneck entities 122 by the default batch size 176 and the length of the performance monitoring interval. The resulting expected production counts measurement is preferably normalized to the standard units of measure for the line so that the expected production counts measurement can be compared with the actual production counts measurement for the line. Once the actual and expected production counts are known (and normalized to the same unit of measure), the runtime module 142 calculates the line production realization metric according to equation 1 below (step 1210). The runtime module 142 then displays the line production quality metric on a display.

$$\text{Realization} = \frac{\text{Actual Production Counts}}{\text{Expected Production counts}} \quad \text{Equation 3}$$

As can be seen, the illustrated MES 112 provides tools for users to model the physical assets in an industrial process and the logical relationships between those assets. The MES 112 uses models of lines 120 and entities 122 to determine which of the entities of a line most limit or best represent the performance of the line and extrapolates the performance of those entities to evaluate the line's production. The MES 112 distills the overall performance of a line 120 into representative metrics that are determined based on modeled entity parameters, real time or near real time production data, and the modeled relationships among the entities 122 of the line.

The Abstract and Summary are provided to help the reader quickly ascertain the nature of the technical disclosure. They are submitted with the understanding that they will not be used to interpret or limit the scope or meaning of the claims. The Summary is provided to introduce a selection of concepts in simplified form that are further described in the Detailed Description. The Summary is not intended to identify key features or essential features of the claimed subject matter, nor is it intended to be used as an aid in determining the claimed subject matter.

For purposes of illustration, programs and other executable program components, such as the operating system, are illustrated herein as discrete blocks. It is recognized, however, that such programs and components reside at various times in different storage components of a computing device, and are executed by a data processor(s) of the device.

Although described in connection with an exemplary computing system environment, embodiments of the aspects of the invention are operational with numerous other general purpose or special purpose computing system environments or configurations. The computing system environment is not intended to suggest any limitation as to the scope of use or functionality of any aspect of the invention. Moreover, the computing system environment should not be interpreted as having any dependency or requirement relating to any one or combination of components illustrated in the exemplary operating environment. Examples of well-known computing systems, environments, and/or configurations that may be suitable for use with aspects of the invention include, but are not limited to, personal computers, server computers, handheld or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the aspects of the invention may be described in the general context of data and/or processor-executable instructions, such as program modules, stored on one or more tangible, non-transitory storage media and executed by one or more processors or other devices. Generally, program modules include, but are not limited to, routines, programs, objects, components, and data structures that perform particular tasks or implement particular abstract data types. Aspects of the invention may also be practiced in distributed computing environments where tasks are performed by remote processing devices that are linked through a communications network. In a distributed computing environment, program modules may be located in both local and remote storage media including memory storage devices.

In operation, processors, computers and/or servers may execute the processor-executable instructions (e.g., software, firmware, and/or hardware) such as those illustrated herein to implement aspects of the invention.

Embodiments of the aspects of the invention may be implemented with processor-executable instructions. The processor-executable instructions may be organized into one or more processor-executable components or modules on a tangible processor readable storage medium. Aspects of the invention may be implemented with any number and organization of such components or modules. For example, aspects of the invention are not limited to the specific processor-executable instructions or the specific components or modules illustrated in the figures and described herein. Other embodiments of the aspects of the invention may include different processor-executable instructions or components having more or less functionality than illustrated and described herein.

The order of execution or performance of the operations in embodiments of the aspects of the invention illustrated and described herein is not essential, unless otherwise specified. That is, the operations may be performed in any order, unless otherwise specified, and embodiments of the aspects of the invention may include additional or fewer operations than those disclosed herein. For example, it is contemplated that executing or performing a particular operation before, contemporaneously with, or after another operation is within the scope of aspects of the invention.

Throughout the specification and claims, terms such as "item," "element," "object," etc. may be used interchangeably to generically describe or identify software or display features unless otherwise indicated.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that several advantages of the aspects of the invention are achieved and other advantageous results attained.

Not all of the depicted components illustrated or described may be required. In addition, some implementations and embodiments may include additional components. Variations in the arrangement and type of the components may be made without departing from the spirit or scope of the claims as set forth herein. Additional, different or fewer components may be provided and components may be combined. Alternatively or in addition, a component may be implemented by several components.

The above description illustrates the aspects of the invention by way of example and not by way of limitation. This description enables one skilled in the art to make and use the aspects of the invention, and describes several embodiments, adaptations, variations, alternatives and uses of the aspects of the invention, including what is presently believed to be the best mode of carrying out the aspects of the invention. Additionally, it is to be understood that the aspects of the invention is not limited in its application to the details of construction and the arrangement of components set forth in the following description or illustrated in the drawings. The aspects of the invention are capable of other embodiments and of being practiced or carried out in various ways. Also, it will be understood that the phraseology and terminology used herein is for the purpose of description and should not be regarded as limiting.

Having described aspects of the invention in detail, it will be apparent that modifications and variations are possible without departing from the scope of aspects of the invention as defined in the appended claims. It is contemplated that various changes could be made in the above constructions, products, and methods without departing from the scope of aspects of the invention. In the preceding specification, various preferred embodiments have been described with reference to the accompanying drawings. It will, however, be evident that various modifications and changes may be made thereto, and additional embodiments may be implemented, without departing from the broader scope of the aspects of the invention as set forth in the claims that follow. The specification and drawings are accordingly to be regarded in an illustrative rather than restrictive sense.

What is claimed is:

1. A manufacturing execution system configured to provide an indication of the performance of a line in an industrial process, the line including a plurality of entities, the entities being configured to perform a plurality of jobs to advance production of one or more line outputs, the manufacturing execution system comprising:
    a configuration module comprising a configuration database, the configuration module being operably connected to a configuration display and user interface adapted to receive configuration inputs from a user of the manufacturing execution system, the configuration module being configured to generate a configuration view on the configuration display and to receive the configuration inputs from the user interface, the configuration module being further configured to:
        generate an entity model representative of each of the entities in the line in response to configuration inputs entered into the user interface defining parameters for each of the entities, each of the entities being configured to perform one of the jobs to advance the production of said one or more line outputs by producing one or more entity outputs from one or more entity inputs;
        store each of the entity models in the configuration database;
        generate a line model representative of the line in response to configuration inputs defining parameters for the line, the entities assigned to the line, and an ordered sequence of the assigned entities, the line model including an indication of a line position of each entity and whether each entity is capable of being a bottleneck entity based on the user inputs defining the assigned entities and the ordered sequence thereof; and
        store the line model in the configuration database; and
    a runtime module operably connected to a runtime display, the configuration database, and a field input of the industrial process, the runtime module being configured to:
        associate a bottleneck identifier with one or more bottleneck entities using the line position indications and the indication of whether each entity is capable of being a bottleneck entity for at least one of the entities;
        determine a line production metric representing performance of the entire line using production data received from the field input and selectively considered for only the bottleneck entities associated with the bottleneck identifier; and
        display the line production metric on the runtime display to provide an indication to a user of the manufacturing execution system of the performance of the entire line in the industrial process;
    wherein the runtime module is configured to adjust the bottleneck entities to improve the production of the line.

2. A manufacturing execution system as set forth in claim 1 wherein the production data for the bottleneck entities comprises runtime data and downtime data for the bottleneck entities.

3. A manufacturing execution system as set forth in claim 2 wherein the line production metric comprises line availability and the runtime module is configured to determine line availability as a function of the runtime data and downtime data for the bottleneck entities.

4. A manufacturing execution system as set forth in claim 3 wherein the runtime module is configured to determine line availability as a runtime percentage.

5. A manufacturing execution system as set forth in claim 1 wherein the configuration module is further configured to generate job models for each of the entities in the line comprising expected production rate parameters based on user inputs defining the expected production rates for the jobs to be run on the entities.

6. A manufacturing execution system as set forth in claim 5 wherein the runtime module is configured to determine which of the entities are the bottleneck entities using the expected production rates for the jobs stored in the job models.

7. A processor executable method of controlling a line in an industrial process, the line including a plurality of entities, the entities being configured to perform a plurality of jobs to advance production of one or more line outputs, the method comprising:
    generating an entity model representative of each of the entities in the line in response to user inputs defining parameters for each of the entities, each of the entities being configured to perform one of the jobs to advance the production of said one or more line outputs by producing one or more entity outputs from one or more entity inputs;

generating a line model representative of the line in response to user inputs defining parameters for the line, the entities assigned to the line, and an ordered sequence of the assigned entities, the line model including an indication of a line position for each of the entities in the line and whether each of the entities is capable of being a bottleneck entity based on the user inputs defining the assigned entities and the ordered sequence thereof;

associating a bottleneck identifier with one or more bottleneck entities using the line position indications and the indication of whether each of the entities is capable of being a bottleneck entity for at least one of the entities and the defined parameters for the line;

determining a line production metric representing performance of the entire line using production data received from the field input and selectively considered for only the bottleneck entities associated with the bottleneck identifier;

displaying the line production metric to a user of the manufacturing execution system to provide an indication of the performance of the entire line in the industrial process; and adjusting the bottleneck entities to improve the production of the line.

8. A method as set forth in claim 7 wherein the received production data comprises runtime data and downtime data for the bottleneck entities.

9. A method as set forth in claim 8 wherein said step of determining the line production metric comprises determining line availability as a function of the received runtime data and downtime data for the bottleneck entities.

10. A method as set forth in claim 9 wherein said step of determining line availability comprises determining a runtime percentage.

11. A method as set forth in claim 7 further comprising generating job models for each of the entities in the line comprising expected production rates based on user inputs defining the expected production rates for the jobs to be run on the entities.

12. A method as set forth in claim 11 further comprising determining which of the entities are the bottleneck entities using the expected production rates for the jobs stored in the job models.

13. A manufacturing execution system configured to provide an indication of the performance of a line in an industrial process, the line including a plurality of entities, the entities being configured to perform a plurality of jobs to advance production of one or more line outputs, the manufacturing execution system comprising:

a configuration module comprising a configuration database, the configuration module being operably connected to a configuration display and user interface adapted to receive configuration inputs from a user of the manufacturing execution system, the configuration module being configured to generate a configuration view on the configuration display and to receive the configuration inputs from the user interface, the configuration module being further configured to:

generate an entity model representative of each of the entities in the line in response to configuration inputs entered into the user interface, each of the entities being configured to perform one of the jobs to advance the production of said one or more line outputs by producing one or more entity outputs from one or more entity inputs;

store each of the entity models in the configuration database;

generate a line model representative of the line in response to configuration inputs defining parameters for the line, the entities assigned to the line, an ordered sequence of the assigned entities, and one or more of the entities that are production source entities for the line, the line model including a reference to each of the entity models and an indication of a line position for each of the entities in the line and whether each of the entities is capable of being a bottleneck entity based on the user inputs defining the assigned entities and the ordered sequence thereof, the line model further including a production source entity indication indicating the entities that are the production source entities based on the user inputs defining the production source entities;

associate a bottleneck identifier with one or more bottleneck entities using the line position indications and the indication of whether each of the entities is capable of being a bottleneck entity for at least one of the entities; and store the line model in the configuration database; and a runtime module operably connected to a runtime display, the configuration database, and a field input of the industrial process, the runtime module being configured to:

determine a line production metric using production data for the production source entities received from the field input and considered based on the production source entity indications included in the line model and the bottleneck entities associated with the bottleneck identifier; and display the line production metric on the runtime display to provide an indication to a user of the manufacturing execution system of the performance of the line in the industrial process;

wherein the runtime module is configured to adjust at least one of the plurality of entities to improve the production of the line.

14. A manufacturing execution system as set forth in claim 13 wherein the production data for the production source entities comprises good production counts data and rejected production counts data for the production source entities.

15. A method as set forth in claim 14 wherein the line production metric comprises line production quality and the runtime module is configured to determine the line production quality as a function of the good production counts data and the rejected production counts data for the production source entities.

16. A method as set forth in claim 14 wherein the runtime module is further configured to determine which of the entities in the line are bottleneck entities using the line position indications and at least one of a user-defined parameter for at least one of the entities and one of the defined parameters for the line.

17. A method as set forth in claim 16 wherein the runtime module is configured to determine an expected production rate for the bottleneck entities.

18. A method as set forth in claim 16 wherein the line production metric comprises line production realization and the runtime module is configured to determine the line production realization as a function of the good production counts and the rejected production counts data for the production source entities and the expected production rate for the bottleneck entities.

19. A method as set forth in claim 13 wherein the runtime module is further configured to normalize the production data by converting the production data from a defined unit of measure for the production source entities to a defined unit of measure for the line that is different from the defined unit of measure for the production source entities.

20. A method as set forth in claim 13 wherein the plurality of entities included in the line includes at least one downstream-most entity and the production source entity indication is configurable to indicate that at least one of the plurality of entities besides the at least one downstream-most entity is the production source entity.

* * * * *